United States Patent
Maeda et al.

(10) Patent No.: US 10,397,439 B2
(45) Date of Patent: *Aug. 27, 2019

(54) SERVER SYSTEM TRANSMITTING JOB TO PROCESSING APPARATUS, INFORMATION PROCESSING SYSTEM, AND CONTROL METHOD FOR SERVER SYSTEM

(71) Applicant: CANON KABUSHIKI KAISHA, Tokyo (JP)

(72) Inventors: Masao Maeda, Kawasaki (JP); Kiyoshi Katano, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 15/389,498

(22) Filed: Dec. 23, 2016

(65) Prior Publication Data

US 2017/0223221 A1  Aug. 3, 2017

(30) Foreign Application Priority Data

Jan. 29, 2016  (JP) ................................. 2016-015079

(51) Int. Cl.
*H04N 1/00* (2006.01)
*H04N 1/327* (2006.01)
*G06F 3/12* (2006.01)

(52) U.S. Cl.
CPC ......... *H04N 1/32765* (2013.01); *G06F 3/126* (2013.01); *G06F 3/1207* (2013.01); *G06F 3/1267* (2013.01); *G06F 3/1288* (2013.01); *H04N 1/00344* (2013.01); *H04N 2201/0039* (2013.01); *H04N 2201/0094* (2013.01); *H04N 2201/3218* (2013.01)

(58) Field of Classification Search
None
See application file for complete search history.

(56) References Cited

U.S. PATENT DOCUMENTS

| | | | |
|---|---|---|---|
| 5,745,607 A | 4/1998 | Maeda | 382/240 |
| 6,334,161 B1 | 12/2001 | Suzuki et al. | 710/29 |
| 6,425,019 B1 | 7/2002 | Tateyama et al. | 710/11 |
| 6,477,589 B1 | 11/2002 | Suzuki et al. | 710/18 |
| 6,546,052 B1 | 4/2003 | Maeda et al. | 375/240.08 |
| 6,559,962 B1 | 5/2003 | Fukunaga et al. | 358/1.15 |
| 6,603,737 B1 | 8/2003 | Fukunaga et al. | 370/229 |
| 6,745,256 B2 | 6/2004 | Suzuki et al. | 710/18 |
| 6,874,082 B2 * | 3/2005 | Tateyama | G06F 3/1209 375/E7.019 |
| 7,062,579 B2 | 6/2006 | Tateyama et al. | 710/104 |
| 7,401,213 B2 | 7/2008 | Tateyama et al. | 713/1 |
| 7,430,660 B2 | 9/2008 | Fukunaga et al. | 713/2 |

(Continued)

FOREIGN PATENT DOCUMENTS

JP  2005-088301  4/2005

*Primary Examiner* — Paul F Payer
(74) *Attorney, Agent, or Firm* — Venable LLP

(57) ABSTRACT

A server system transmits, in the case of holding a job for a processing apparatus at the time when connection to the processing apparatus has been established, a notification message indicating an occurrence of the job to the processing apparatus through the connection-established communication even in the case where no inquiry associated with the job is made from the processing apparatus through the connection-established communication.

20 Claims, 12 Drawing Sheets

(56) References Cited

U.S. PATENT DOCUMENTS

| | | | | |
|---|---|---|---|---|
| 9,001,354 B2* | 4/2015 | Enomoto | ........... | H04N 1/00209 |
| | | | | 358/1.12 |
| 9,019,532 B2* | 4/2015 | Anand | ................ | H04L 67/2823 |
| | | | | 358/1.13 |
| 9,311,037 B2* | 4/2016 | Kuribara | ................ | G06F 3/1203 |
| 9,313,363 B2 | 4/2016 | Maeda | | |
| 9,542,134 B2* | 1/2017 | Okumura | .............. | G06F 3/1203 |

* cited by examiner

SERVER SYSTEM TRANSMITTING JOB TO PROCESSING APPARATUS, INFORMATION PROCESSING SYSTEM, AND CONTROL METHOD FOR SERVER SYSTEM

BACKGROUND OF THE INVENTION

Field of the Invention

The present invention relates to a processing system including a server system and a processing apparatus which executes a job.

Description of the Related Art

Due to the recent diffusion of cloud services, there are provided various services achieved by combining a management server located at the cloud service and a processing apparatus connected to the management server via a network. For example, there is provided a cloud printing system in which a print job transmitted from a user's terminal apparatus to a print management server located at the cloud service via a network is acquired by a printer which is the processing apparatus from the print management server via the network for printing.

In the cloud printing system, each of the printers is required to acknowledge that a job for its own is held in the print management server. In order to achieve this, the following system is conceivable. Namely, there is a so-called push notification system in which the print management server who received a job from the user's terminal notifies the printer of job occurrence and the printer having received such notification acquires the job from the print management server for the printing.

However, in the case where the job is supplied from the user's terminal in a state in which the power of the printer is turned off, the printer may not be able to receive the push notification from the print management server. In this case, even if the printer is turned on afterwards, the printer cannot acknowledge presence/absence of the job which has been supplied during its power-off state, and as a result, the job may not be able to be automatically executed. Japanese Patent Laid-open No. 2005-088301 discloses a technique of a printer accessing a server and inquiring whether image data is stored in the server after initial setting of the printer at the time of turning on the power of the printer.

However, in the above method, there is a problem that the printer must always make communications to make inquiry to the server at the time of turning on the power of the printer. As a cloud printing service grows larger, whenever printers provided worldwide turn on their power, inquiries to the servers increase, thereby causing great influence on the aspect of traffic and server loads. Meanwhile, in the case where the printer does not acquire job information at the time of turning on the power of the printer, the printer may not automatically perform printing upon turning on the power of the printer even if an unprocessed job remains in the server side.

Such a problem is not limited to the printing system including the printer and the management server. In a processing system that includes other types of apparatuses and the management server, a similar problem may arise in a form of the system in which the management server notifies the processing apparatus of a job and the processing apparatus inquires of the management server about job information based on such notification.

SUMMARY OF THE INVENTION

A server system according to the present invention which transmits, via a network, a job received via the network to a processing apparatus who executes the job, includes a transmission unit for transmitting, in a case where a job for the processing apparatus is held by a holding unit at the time at which a connection of communication with the processing apparatus has been established, a notification message indicating an occurrence of a job to the processing apparatus through the connection-established communication even in a case where no inquiry associated with the job is made from the processing apparatus through the connection-established communication. In a case where the job is not held at the time of establishment of the connection, the transmission unit does not transmit the notification message.

Further features of the present invention will become apparent from the following description of exemplary embodiments (with reference to the attached drawings).

BRIEF DESCRIPTION OF THE DRAWINGS

FIG. 12 is a sequence diagram in the case where a job is supplied from the terminal apparatus 200 while the MFP 300 is in a power-off state, and then the power of the MFP 300 is turned on.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
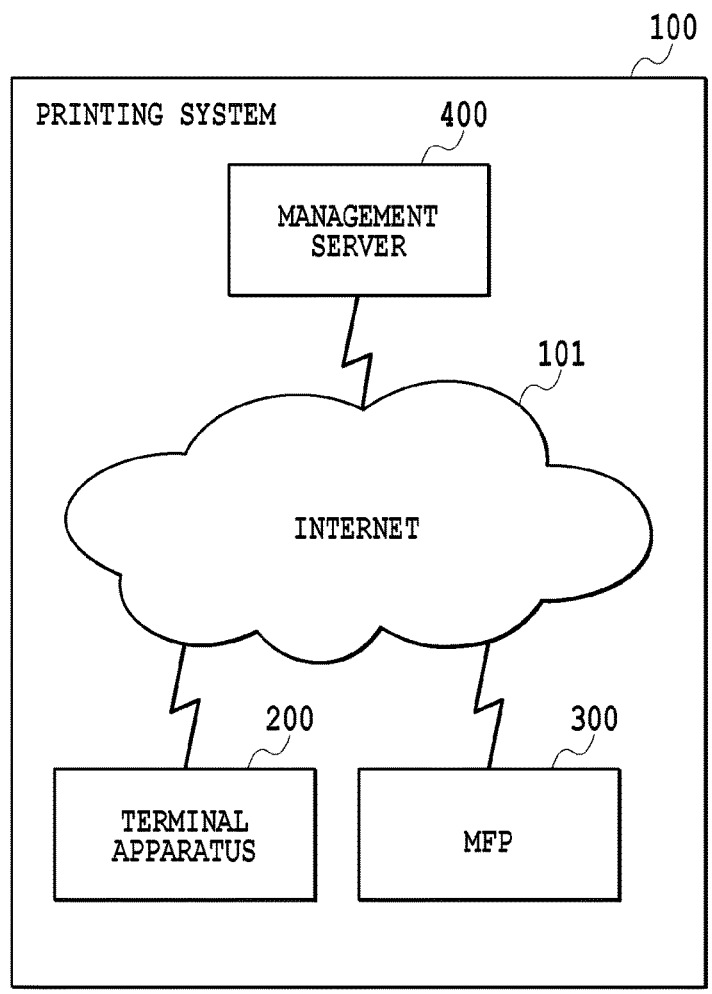
FIG. 1 is a diagram showing a configuration of a printing system 100 according to one embodiment of the present invention.
Figure 6:
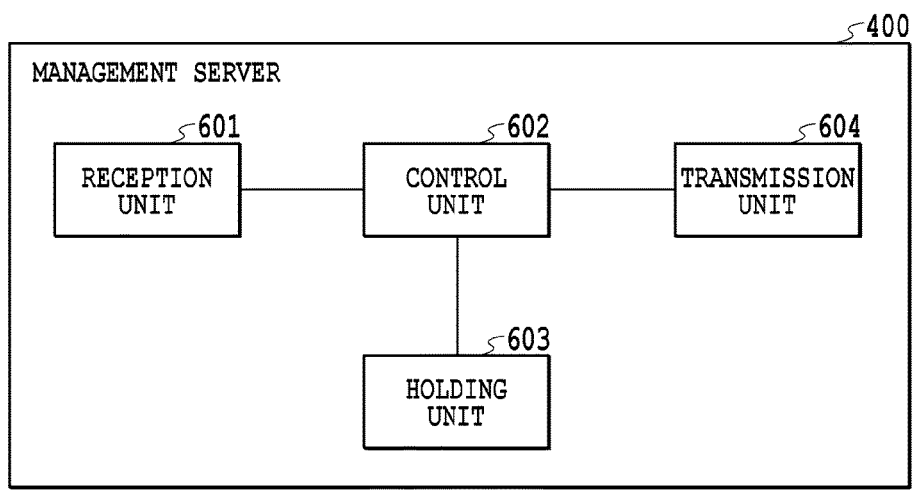
FIG. 6 is a block diagram showing a functional configuration of the management server 400.

FIG. 1 is a diagram showing a configuration of a printing system 100 according to one embodiment of the present invention. In the printing system 100, a terminal apparatus 200, a Multi Function Printer 300 (hereinafter referred to as an "MFP 300") as a processing apparatus, and a management server 400 as a server system are mutually connected to each other via an internet 101. Here, the management server 400 may be configured by one server apparatus and the server may function as the server system of the present embodiment, or the management server 400 may be configured by a plurality of server apparatuses and these server apparatuses may function as the server system. In the latter case, each of the functions of the management server 400 as will be described later in FIG. 6 is appropriately shared among the plurality of the server apparatuses.

The terminal apparatus 200 and the MFP 300 may be communicatably connected to each other on one LAN, or as shown in FIG. 1, may be communicatably connected to each other via the internet 101. In the case where the terminal apparatus 200 and the MFP 300 are connected via the internet 101, the terminal apparatus 200 and the MFP 300 may be located apart from each other for use. With respect to a configuration in which each of the terminal apparatus 200, the MFP 300, and the management server 400 is connected to the internet 101, existing techniques should be applied hereto. There are methods of using, for example, a cable LAN, a wireless LAN, and a portable phone line.

Furthermore, the management server 400 and the MFP 300 mutually establish an Extensible Messaging and Presence Protocol (XMPP) connection. Then, the management server 400 notifies the MFP 300 of the occurrence of a job by using an XMPP message. Since the management server 400 and the MFP 300 are connected via the internet 101, frequent job inquiries to the management server 400 by the MFP 300 increase overhead in making communications, thereby increasing traffic and server loads. Therefore, at the time of job supply by the terminal apparatus 200, job notification is transmitted from the management server 400 to the MFP 300, and, upon reception of this notification, the MFP 300 transmits to the management server 400 a request for transmitting job information. However, if the MFP 300 is in a power-off state, the XMPP is disconnected from the management server 400, whereby the management server 400 cannot transmit job notification to the MFP 300 at the time of the job supply while the MFP 300 is in the power-off state. In such a case, it may be possible to use a method in which the MFP 300 inquires about a job at the time of turning on the power of the MFP 300. However, in the case where multiple jobs of the MFPs 300 are managed by the single management server 400, the traffic and service loads may increase as a result of increased job inquiries by powering those MFPs 300 on.

In this regard, according to the present embodiment, the management server 400 determines, in the case where the XMPP connection to the MFP 300 is established, whether or not the management server 400 holds a job for the MFP 300. If the management server 400 holds the job, the management server 400 transmits, without receiving inquiry from the MFP 300, job notification of the held job to the MFP 300 who has established the XMPP connection. Further, the management server 400 transmits the job notification of the held job to the MFP 300 who has established the XMPP connection even if the job notification of that job has already been transmitted. The details will be described later.

Incidentally, FIG. 1 is described by exemplifying an embodiment in which the MFP is used as a processing apparatus and the printing system is used as a processing system. However, it is not limited to this embodiment. The processing apparatus may be any apparatus other than the MFP as long as the processing apparatus performs various kinds of processing in accordance with a job transmitted from the management server.

Figure 2:
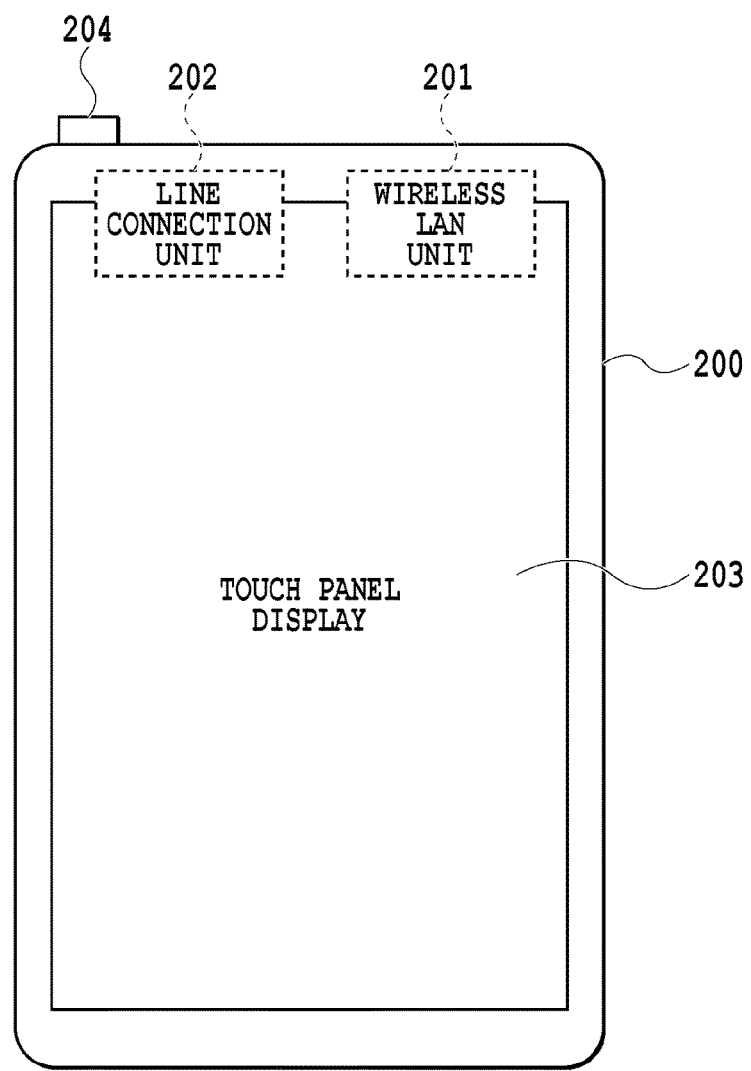
FIG. 2 is a view showing an appearance of a terminal apparatus 200.

FIG. 2 is a view showing an appearance of the terminal apparatus 200. According to the present embodiment, a form of using a smartphone as the terminal apparatus 200 will be explained. The smartphone is a multi-functional type portable phone including a camera, an Internet browser, and a mailing function besides the function of the portable phone. A wireless LAN unit 201 is a unit located in the apparatus for performing communications using a wireless LAN. A line connection unit 202 is a unit located in the apparatus for performing communications by connecting it to a portable phone line. A touch panel display 203 provided on the front face of the terminal apparatus 200 is equipped with an LCD type display mechanism and a touch-panel type operation mechanism. A representative operating method is that the user causes button-shaped operation parts to be displayed on the touch panel display 203 and makes touching operation on the touch panel display 203 to issue an event whose button is pressed. A power button 204 is used for turning on and off the terminal apparatus 200. Note that, although the example of the smartphone is described here, a tablet, a PC terminal, and other electronic equipment may also be used as the terminal apparatus 200.

Figure 3:
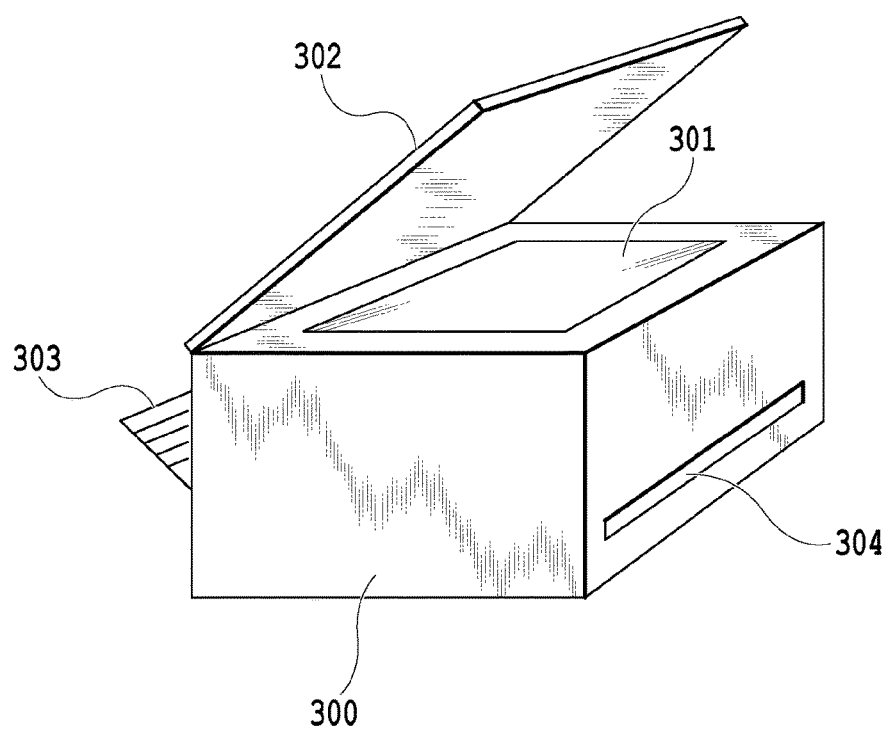
FIG. 3 is a view showing an appearance of an MFP 300.

FIG. 3 is a view showing an appearance of the MFP 300. According to the present embodiment, a multifunction printer (MFP) which includes a printing apparatus, a scanner, and other functions is exemplified. A document platen 301 is a transparent glass platen and is used for scanning a document placed thereon by the scanner. A document pressure plate 302 is a cover which presses the document against the document platen to prevent the document from floating upon scanning by the scanner and which prevents light from outside from entering into a scanner unit. A print sheet insertion opening 303 is an opening to set various sizes of sheets. The sheets set on this opening are conveyed to a printing unit one by one to make desired printing, and are ejected from a print sheet output opening 304.

Figure 4:
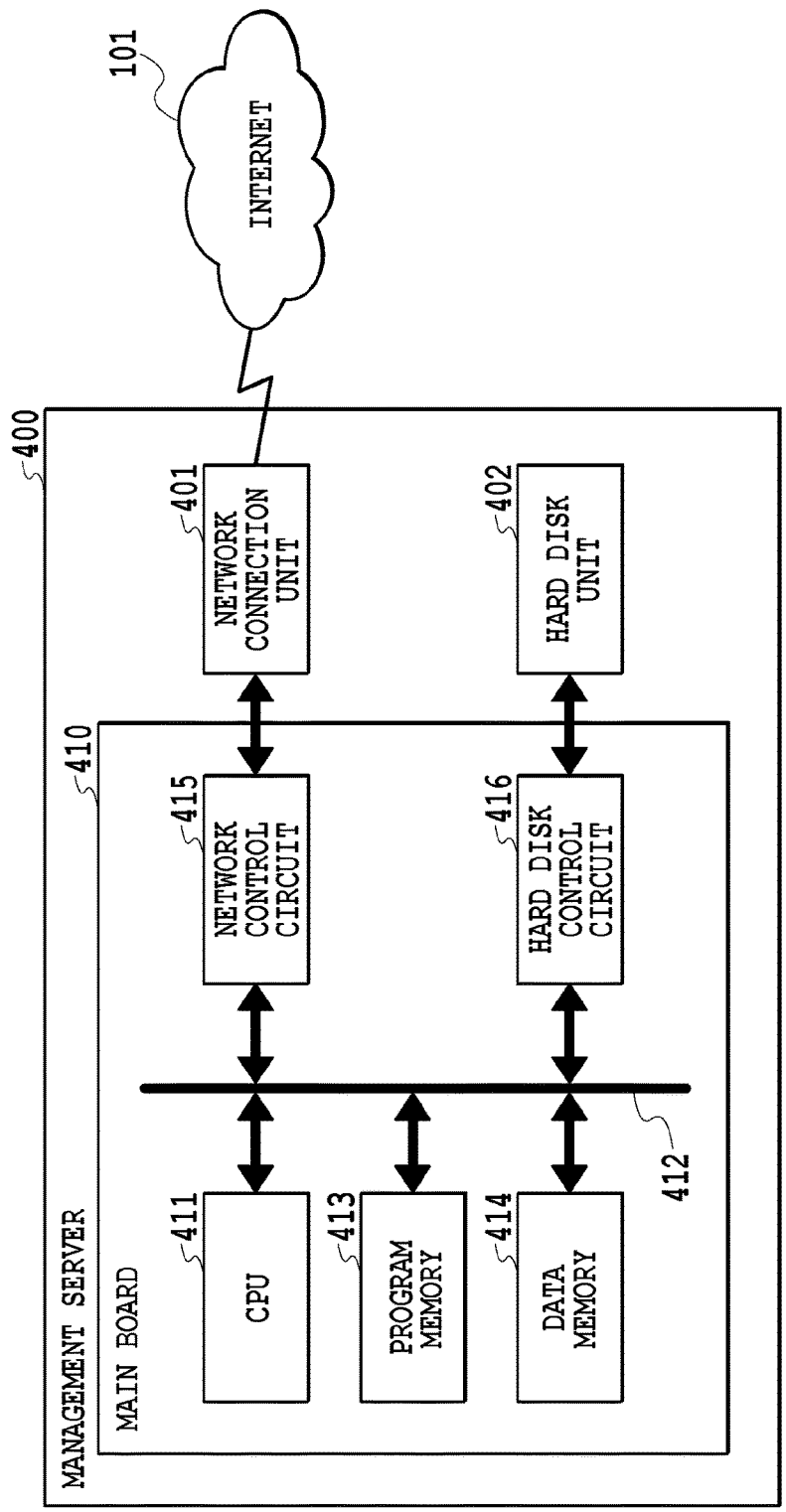
FIG. 4 is a block diagram showing a configuration of a control system of a management server 400.

FIG. 4 is a block diagram showing a configuration of a control system of the management server 400. The management server 400 includes a main board 410 which controls an entire apparatus of the server, a network connection unit 401, and a hard disk unit 402. A CPU 411 which is a microprocessor located in the main board 410 activates in accordance with a control program stored in a program memory 413 connected via an internal bus 412 and a content of a data memory 414 connected via the internal bus 412. The CPU 411 controls the network connection unit 401 via a network control circuit 415 so as to be connected to the internet 101 to make communications with other apparatuses. The CPU 411 can read/write data from/on the hard disk unit 402 connected via a hard disk control circuit 416. In the hard disk unit 402, an operating system loaded on the program memory 413 for use, control software for the management server 400, and various kinds of data are stored. Print job data received from the terminal apparatus 200 is stored in the hard disk unit 402 by means of identifying each MFP 300 that should execute the print job. Here, the management server 400 is one type of information processing apparatus.

Figure 5:
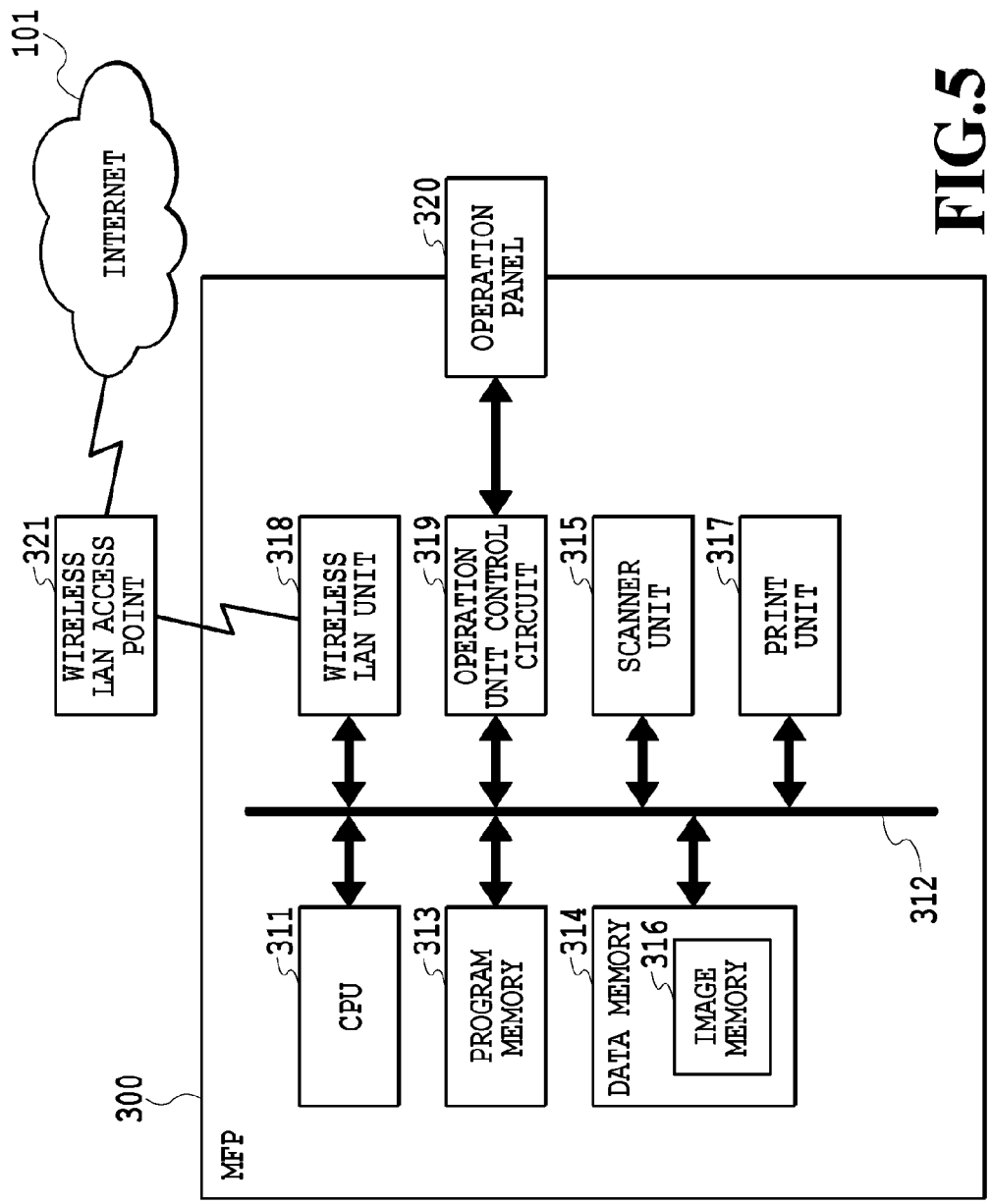
FIG. 5 is a block diagram showing a configuration of a control system of the MFP 300.

FIG. 5 is a block diagram showing a configuration of a control system of the MFP 300. A CPU 311 which is a microprocessor activates in accordance with a control program stored in a program memory 313 which is a ROM and is connected via an internal bus 312 and a content of a data memory 314 which is a RAM and is connected via the internal bus 312. The CPU 311 controls a scanner unit 315 to read a document and stores an image of the document in an image memory 316 provided in a data memory 314. In addition, the CPU 311 controls a print unit 317 to print an image in the image memory 316 provided in the data memory 314 on a print medium.

The CPU 311 can control a wireless LAN unit 318 so as to be connected to a wireless LAN access point 321 provided outside. The wireless LAN access point 321 is connected to the internet 101, and the CPU 311 of the MFP 300 is connected to the internet via the wireless LAN access point 321 to make communications with other apparatuses. The CPU 311 controls an operation unit control circuit 319 so as to display a state of the MFP 300 and to display a function selection menu on an operation panel 320 provided on the outer face of the MFP 300 and so as to receive operation from a user. By combining the above configurations, the MFP 300 offers various functions to the user. For example, the MFP 300 can acquire a print job from the management server 400 connected via the internet 101 and execute printing on a print medium through the control of the print unit 317. Further, the MFP 300 controls the scanner unit 315 so as to transmit an image of a read document to the management server 400 or other apparatuses. Moreover, the MFP 300 can start its action upon receiving user input onto the operation panel 320, and can control the scanner unit 315 to execute a copying function by printing the image of the read document using the print unit 317.

Next, explanations will be given on a functional configuration and processing details of the management server 400.

FIG. 6 is a block diagram showing an example of the functional configuration of the management server 400. The management server 400 includes a reception unit 601, a control unit 602, a holding unit 603, and a transmission unit 604. The reception unit 601 receives various types of requests from the MFP 300 and receives jobs from the terminal apparatus 200. The control unit 602 controls to execute processing shown in a flow chart which will be described later. The holding unit 603 holds jobs transmitted from the terminal apparatus 200 by use of the hard disk unit 402. The transmission unit 604 transmits various types of information to the MFP. According to the present embodiment, the CPU 411 in the management server executes a program stored in the program memory 413 so that the CPU 411 functions as each of the functional units shown in FIG. 6.

Figure 7:
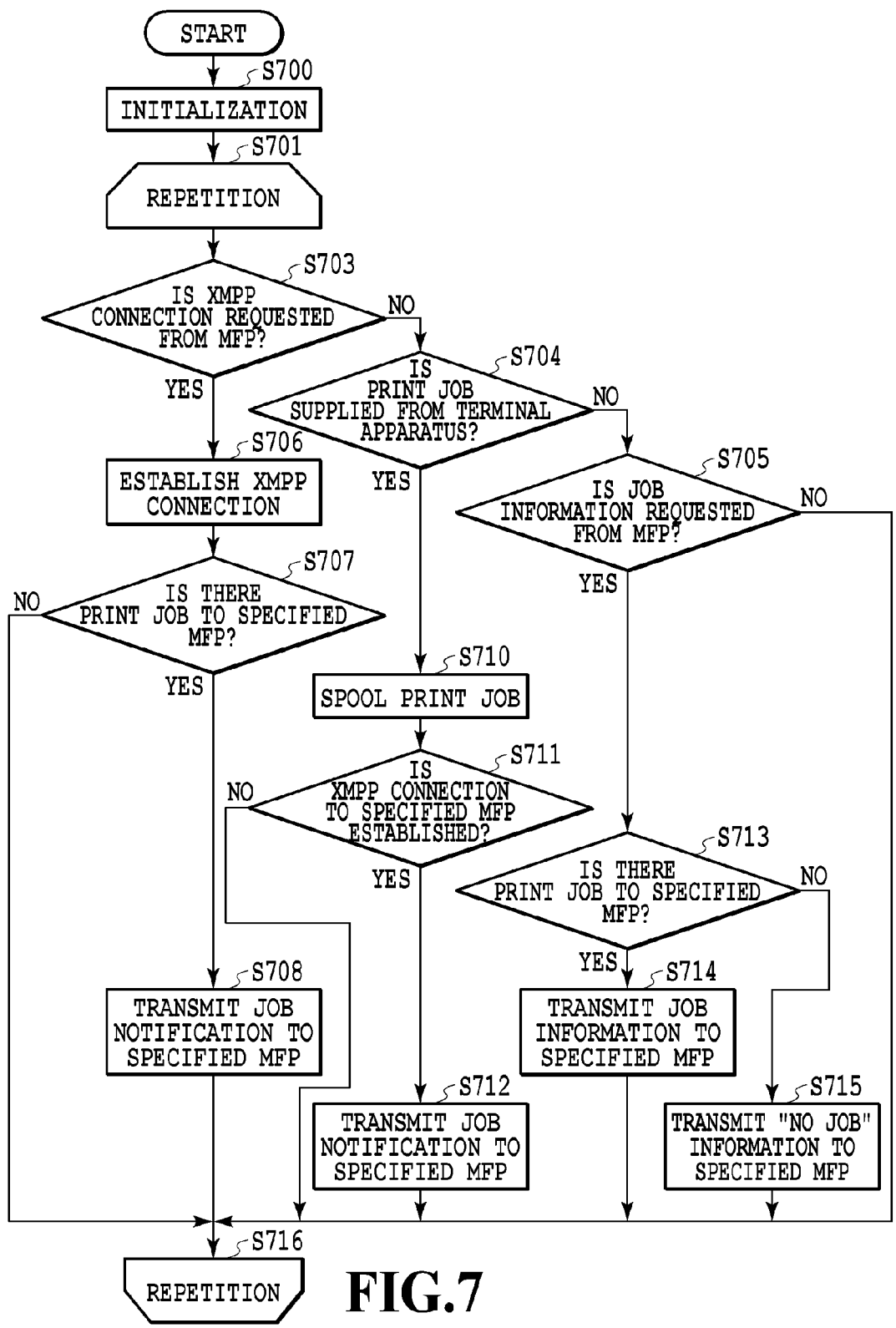
FIG. 7 is a flow chart showing processing of the management server 400.

FIG. 7 is a flow chart showing processing details of the CPU 411 in the management server 400. The processing according to this flow chart shows that once the management server 400 is activated and a control program of the management server 400 is activated, the CPU 411 functions as each of the units shown in FIG. 6 to start the processing.

The control unit 602 executes various kinds of initialization on the program to control the management server 400 in Step S700, and then, starts a repetition loop from Step S701 to Step S716. In the repetition loop, various events received from the outside by the reception unit 601 are detected in each of Step S703 through Step S705 and the control unit 602 performs processing in accordance with each event.

In Step S703, in the case where the reception unit 601 detects that an XMPP connection request has been received from the MFP 300 as an event, the control unit 602 proceeds to Step S706 to perform XMPP connection establishment processing on the MFP 300 who has transmitted the XMPP connection request. Otherwise, the control unit 602 proceeds to Step S704.

Once the XMPP connection establishment processing is performed in Step S706, the control unit 602 then proceeds to Step S707 and determines whether a print job to be executed for the MFP 300 whose XMPP connection has been established in Step S706 is spooled in the holding unit 603. In the case where the print job for the specified MFP 300 is spooled for storage, the control unit 602 proceeds to Step S708 and uses an XMPP channel in which the connection has been established to transmit a message of job notification to the specified MFP 300. Here, the job notification message refers to a message to notify the occurrence of a job. On the other hand, job information, which refers to the content itself of a job, is transmitted from the management server 400 based on a request from the MFP 300 as will be described later in Steps S705 and S714. Meanwhile, in the case where the print job for the specified MFP 300 does not exist in Step S707, the job notification is not given to the specified MFP 300. As such, according to the present embodiment, in the case where the print job for the MFP 300 whose connection has been established after performing the XMPP connection establishment processing is spooled, the management server 400 transmits the job notification to the MFP 300 without receiving inquiry from the MFP 300. Further, the job notification is transmitted to the specified MFP 300 even if the job notification has already been transmitted to that MFP 300.

In Step S704, in the case where the reception unit 601 detects that a print job has been supplied from the terminal apparatus 200 as an event, the control unit 602 proceeds to Step S710. Otherwise, the control unit 602 proceeds to Step S705. In Step S710, the control unit 602 spools the supplied print job in the holding unit 603. In the following Step S711, the control unit 602 specifies the MFP 300 that should execute the supplied print job and determines whether an XMPP connection to the specified MFP 300 has already been established. If the XMPP connection has already been established, the process proceeds to Step S712. In Step S712, the control unit 602 uses an XMPP connection channel for the specified MFP 300 to transmit a message of job notification. Meanwhile, in Step S711, if the XMPP connection has not been established, the job notification is not given to the MFP 300.

In Step S705, in the case where the reception unit 601 detects that a job information request has been received from the MFP 300 as an event, the process proceeds to Step S713. Otherwise, the process returns to Step S701 to perform the repetition processing. Here, the job information request refers to the content of the job itself, and is a request demanding transmission of a job (referred to as job information) managed in the management server 400 to the MFP 300. In Step S713, the control unit 602 specifies the MFP 300 who has transmitted the job information request, and determines whether the print job that should be executed in the specified MFP 300 is spooled (held) in the holding unit 603. In Step S710, in the case of determining that the print job for the specified MFP 300 is spooled, the process proceeds to Step S714, and the control unit 602 transmits the job information for the specified MFP 300 via an XMPP channel in which connection is established. Once the job information is transmitted, the control unit 602 deletes the job information spooled in the holding unit 603. Alternatively, the control unit 602 may delete the job information spooled in the holding unit 603 in the case where the management server 400 receives ACK information or the like indicating proper transmission of the job information after its transmission. Meanwhile, in Step S713, in the case of determining that there is no print job for the specified MFP 300, the process proceeds to Step S715 to transmit information indicating "no job" as a response to the specified MFP 300.

Incidentally, determination processing regarding the existence of a job in S707 is not limited to the case where the processing is performed after the connection establishment in S706, but may also be performed while the connection is not established. For example, the management server 400 may periodically perform determination processing on presence/absence of a job for all MFPs registered in the management server 400, and the management server 400 may determine, without performing determination processing on job presence at the time of the connection establishment, whether or not to make notification based on a latest determination result performed before the connection establishment. Alternatively, the determination processing may be performed after the lapse of predetermined time from the establishment of the connection. As shown in S706 and S707 in FIG. 7, however, the presence/absence of a job is determined at the time of the connection establishment to specify the MFP that requires establishing connection and confirming the presence of the job. In other words, the management server 400 does not need to periodically determine presence/absence of the job for all MFPs including ones that do not consequently establish the connection.

Next, explanations will be given on the case of disconnecting the XMPP connection. For example, if the power of the MFP 300 is switched from on to off, disconnection processing is made, and the management server 400 acknowledges that the XMPP connection of the specified MFP 300 has been disconnected. Accordingly, the subsequent processing of the management server 400 for the MFP 300 who has made disconnection processing is as shown in FIG. 7. Meanwhile, there may be a case where the XMPP connection is disconnected due to abnormal events (e.g., breakage and drawn-out) instead of a normal disconnection sequence. In such a case, the management server 400 may not be able to identify the disconnection, and as a result, the management server 400 identifies that the XMPP connection to the specified MFP 300 is still established. Accordingly, if a print job is supplied from the terminal apparatus in this situation, the management server 400 transmits job notification as shown in S712. However, as a matter of course, the management server 400 receives no response from the MFP 300 and thus acknowledges that the XMPP connection to the specified MFP 300 is disconnected due to some kind of error such as a timeout.

Next, explanations will be given on a functional configuration and processing details of the MFP 300.

Figure 8:
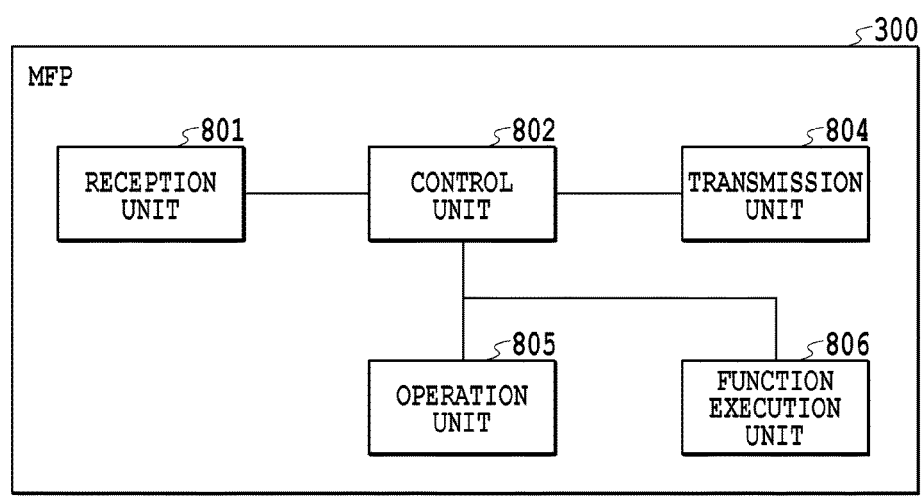
FIG. 8 is a block diagram showing a functional configuration of the MFP 300.

FIG. 8 is a block diagram showing an example of a functional configuration of the MFP 300. The MFP 300 includes a reception unit 801, a control unit 802, a transmission unit 804, an operation unit 805, and a function execution unit 806. The reception unit 801 receives job notification, job information, and the like from the management server 400. The control unit 802 makes control to execute processing which will be shown later in a flow chart. The transmission unit 804 transmits various requests to the management server 400. The operation unit 805 receives operation by the user of the MFP 300 through the operation panel 320. The function execution unit 806 executes each of the functions included in the MFP 300 such as copying and scanning. According to the present embodiment, the CPU 311 in the MFP 300 executes the program stored in the program memory 313 so that the CPU 311 functions as each of the function units shown in FIG. 8.

Figure 9:
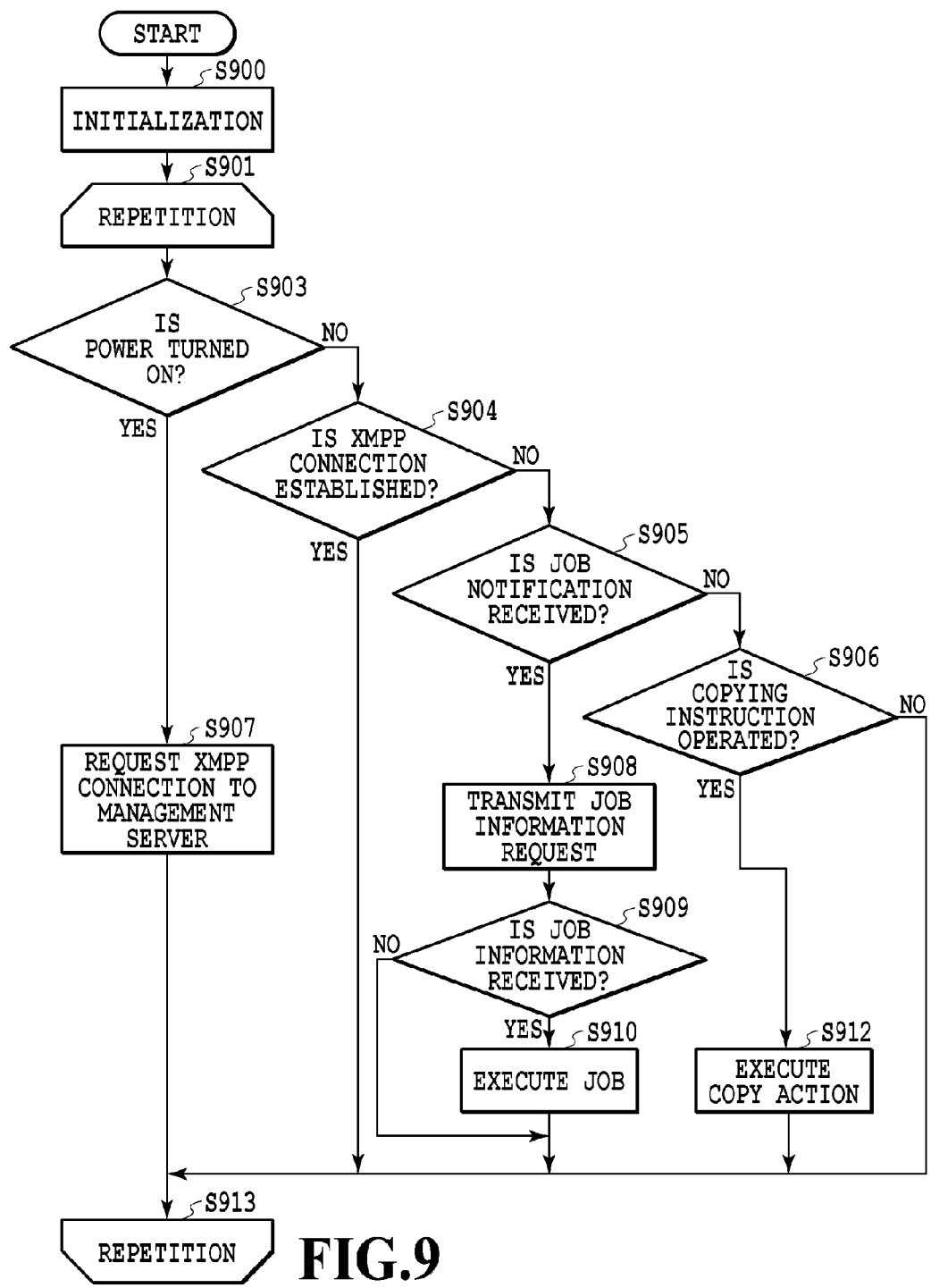
FIG. 9 is a flow chart showing processing of the MFP 300.

FIG. 9 is a flow chart showing processing details of the CPU 311 in the MFP 300. The processing according to this flow chart shows that the MFP 300 is connected to an AC power supply, and once the control program of the MFP 300 activates, the CPU 311 functions as each of the units shown in FIG. 8 to start the processing. At this time, although the MFP 300 is connected to the AC power supply, the MFP 300 is in a power-off state in appearance and is in a so-called standby state with extremely small consumption power.

The control unit 802 executes various kinds of initialization processing on the MFP 300 in Step S900, and then, starts a repetition loop from Step S901 to Step S913. In the repetition loop, various events received from the outside by the reception unit 801 or the operation unit 805 are detected in each of Step S903 through Step S906 and the control unit 802 executes processing in accordance with each event.

In Step S903, in the case where the operation unit 805 detects that the operation of turning the power on through operation of the operation panel 320 of the MFP 300 as an event, the control unit 802 proceeds to Step S907. Otherwise, the control unit 802 proceeds to Step S904. In Step S907, the control unit 802 transmits an XMPP connection request to the management server 400 from the transmission unit 804. Once the management server 400 performs XMPP connection establishment processing in response to the XMPP connection request, the XMPP connection is established between the MFP 300 and the management server 400, and thus an event of the XMPP connection establishment is detected.

In Step S904, in the case where the reception unit 801 detects that the XMPP connection to the management server 400 has been established as an event, such XMPP connection establishment is only confirmed and no processing such as making communications with the management server 400 is not particularly performed. Otherwise, the process proceeds to Step S905.

In Step S905, in the case where the reception unit 801 detects that a message of job notification is received from the management server 400 as an event through a connection-established XMPP channel, the control unit 802 proceeds to Step S908. Otherwise, the control unit 802 proceeds to Step S906. In Step S908, once the job notification message is received, the control unit 802 starts processing of acquiring the job. Specifically, in Step S908, the control unit 802 transmits a job information request to the management server 400 and receives its response. In a succeeding Step S909, the control unit 802 confirms the content of the response received as a result of Step S911 and determines whether the job information for the MFP 300 of its own has been received. In the case where the job information has been received, the control unit 802 proceeds to Step S910 and causes the function execution unit 806 to execute printing of the received job. Meanwhile, as a result of Step S909, in the case of receiving "no job," the job is not executed.

In Step S906, in the case where the operation unit 805 detects that operation to instruct copy action execution is made through operation of the operation panel 320 as an event, the control unit 802 proceeds to Step S912 and executes copy action. Otherwise, the control unit 802 returns to Step S901 to perform repetition processing.

Incidentally, job information transmitted by the management server 400 in S714 described above and received by the MFP 300 in S909 described above may be data to be printed such as an image and a text, or may be location information such as a URL indicating the location of a data storage. In the latter case, the management server 400 stores the data to be printed in a memory such as the hard disk unit 402 in the management server 400 or in a server outside the management server 400. Then, the management server 400 transmits the location information indicating the location of the storage to the MFP 300 in S714. In this case, in S910, the MFP 300 accesses the storage location of the data to be printed according to the received location information, acquires the data as a result of such access, and executes printing based on the acquired data.

As described above, the MFP 300 according to the present embodiment does not immediately transmit the job information request even if the power is turned on. The MFP 300 according to the present embodiment transmits, in the case where the job notification is received from the management server 400 (YES in S905), the job information request after the power of the MFP 300 has been turned on.

Explanations are given below on the entire processing flow of the printing system 100 according to the sequence diagram. Note that, in FIGS. 10 through 12, a user 500 is exemplified for an explanation as the user of the terminal apparatus 200 and the MFP 300. However, since the terminal apparatus 200 and the MFP 300 are connected via the management server 400, the terminal apparatus 200 and the MFP 300 may be provided apart from each other, or may be owned by different users.

Figure 10:
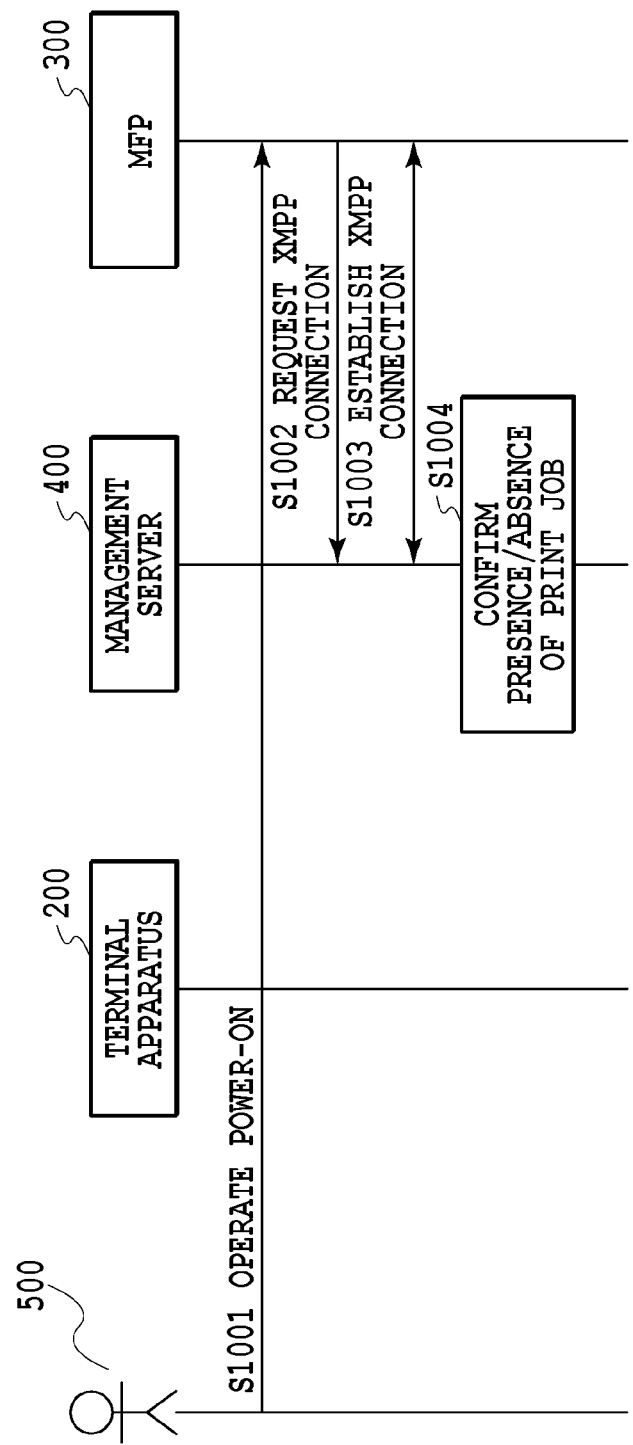
FIG. 10 is a sequence diagram in the case where the power of the MFP 300 is turned on in a state in which no job exists in the management server 400.

FIG. 10 is a sequence diagram in the case where the power of the MFP 300 is turned on in a state of which no job exists in the management server 400 side. In Step S1001, the user 500 operates the operation panel 320 of the MFP 300 to turn on the power of the MFP 300. In accordance with the operation to turn on the power, the MFP 300 performs processing for a powered-on event and makes an XMPP connection request to the management server 400 in Step S1002. In response to the XMPP connection request, the management server 400 performs processing of an XMPP connection to establish the XMPP connection between the management server 400 and the MFP 300 in Step S1003. Once the XMPP connection is established, the management server 400 determines, in Step S1004, whether a print job to be executed for the MFP 300 whose XMPP connection has been established in Step S1003 is spooled in the hard disk unit 402. In the example of FIG. 10, the print job for the MFP 300 whose XMPP connection has been established is assumed to be not spooled. Therefore, in this case, the print job for the specified MFP 300 is not spooled, and thus processing ends at the completion of the determination result in Step S1004. Therefore, the job inquiry processing for the management server 400 is not also performed by the MFP 300.

Figure 11:
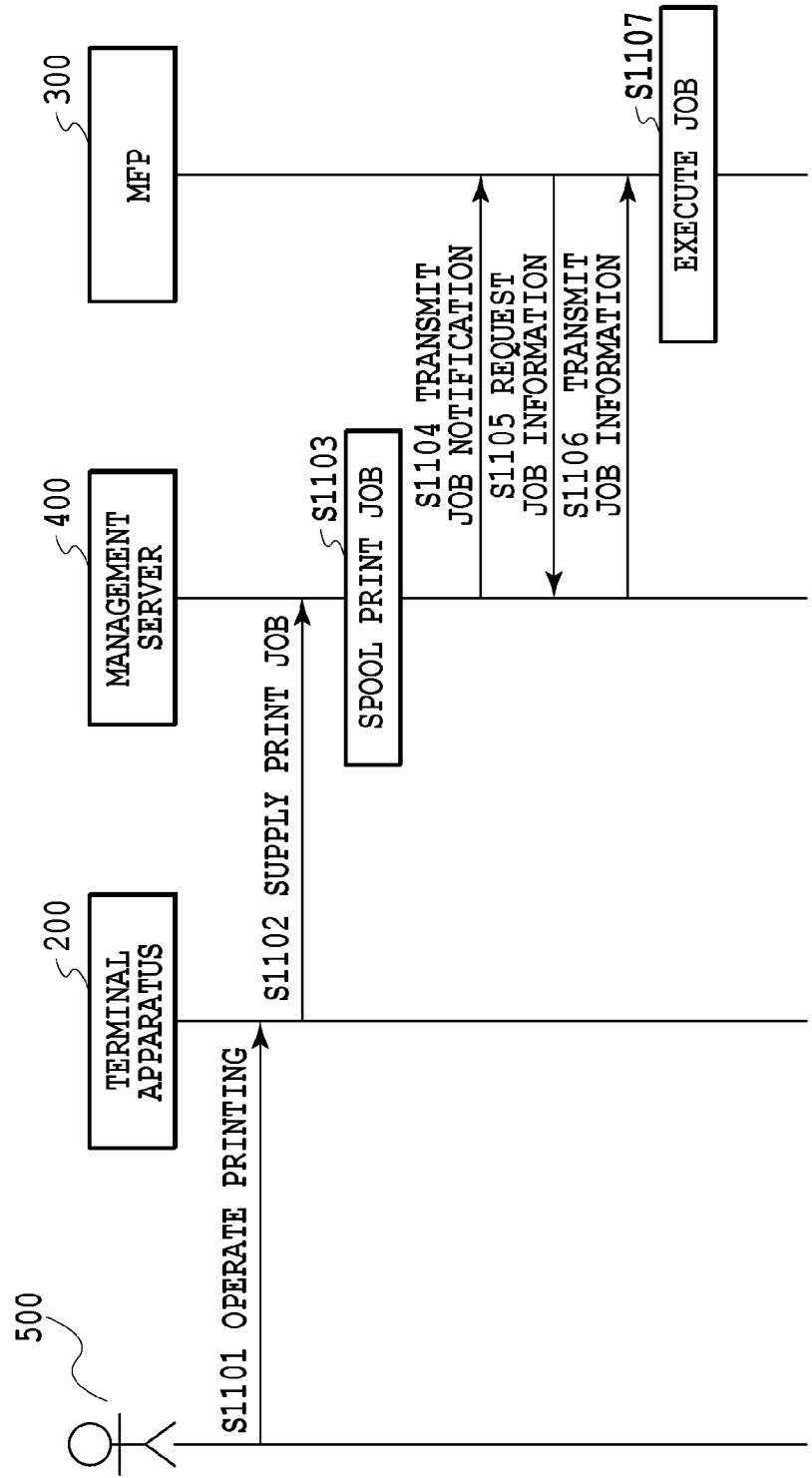
FIG. 11 is a sequence diagram in the case where a job is supplied from the terminal apparatus 200 while the MFP 300 is in a power-on state.

FIG. 11 is a sequence diagram in the case where a job is supplied from the terminal apparatus 200 while the MFP 300 is in a power-on state. In Step S1101, the user 500 operates the terminal apparatus 200 to perform printing of desired data. In accordance with the user's printing operation, the terminal apparatus 200 transmits a print job to the management server 400 in Step S1102. In response to the print job being transmitted, the management server 400 spools the print job in its own hard disk unit 402 in Step S1103. Then, in Step S1104, the management server 400 transmits job notification to the MFP 300 whose print job is to be executed. In accordance with the job notification being transmitted, the MFP 300 performs processing for a job notification reception event and transmits a job information request to the management server 400 in Step S1105. In response to the job information request, the management server 400 transmits the print job spooled for storage in the hard disk unit 402 to the MFP 300 in Step S1106. The MFP 300 executes, upon reception of job information (print job), the print job in Step S1107. Here, in the case where a plurality of print jobs for the specified MFP 300 are spooled, data on all print jobs may be transmitted as job information in Step S1106. In this case, the MFP 300 makes control so as to successively execute all print jobs. Alternatively, the MFP 300 may make control by transmitting the job information request every time one print job is accomplished and executing a next print job in succession if the next print job information exists.

Figure 12:
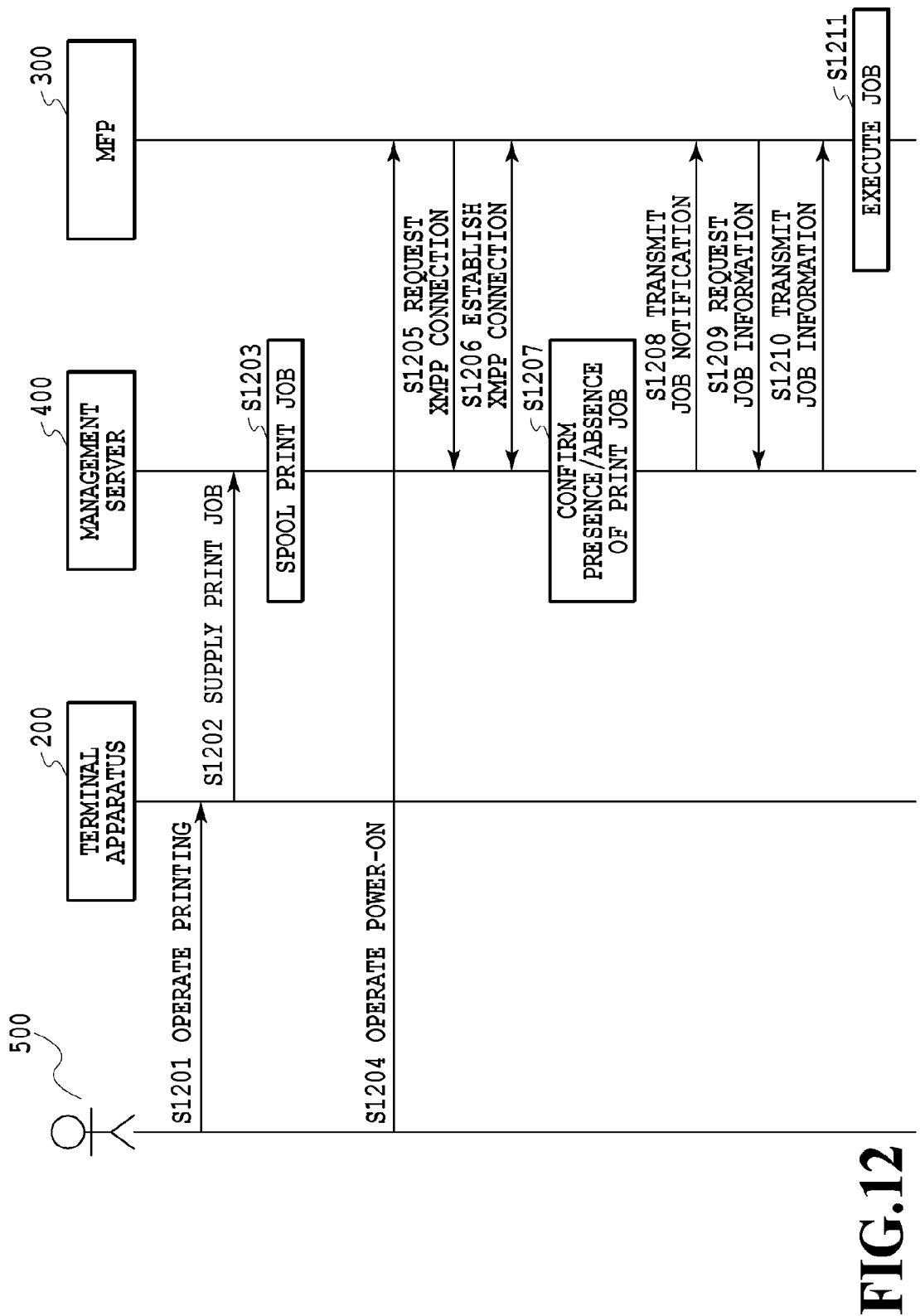

FIG. 12 is a sequence diagram in the case where a job is supplied from a terminal apparatus 200 while the MFP 300 is in a power-off state, and then the power of the MFP 300 is turned on. In Step S1201, the user 500 operates the terminal apparatus 200 to perform printing of desired data. In accordance with the user's printing operation, the terminal apparatus 200 transmits a print job to the management server 400 in Step S1202. In response to the print job being transmitted, the management server 400 spools the print job to its own hard disk unit 402 in Step S1203. Here, the management server 400 is in a state where an XMPP connection is not established to the MFP 300, and thus, job notification for the MFP 300 is not transmitted at the moment.

Next, in Step S1204, the user 500 operates the operation panel 320 of the MFP 300 to perform operation of turning on the power of the MFP 300. In accordance with the operation to turn on the power, the MFP 300 performs processing for the powered-on event and makes an XMPP connection request to the management server 400 in Step S1205. In response to the XMPP connection request, the management server 400 performs processing of the XMPP connection to establish the XMPP connection between the management server 400 and the MFP 300 in Step S1206.

Once the XMPP connection is established, the management server 400 determines, in Step S1207, whether a print job to be executed for the MFP 300 whose XMPP connection has been established is spooled in the hard disk unit 402. Since the print job for the specified MFP 300 is spooled for storage in this case, the management server 400 transmits, in Step S1208, job notification to the MFP 300 whose print job is to be executed. In accordance with the job notification being transmitted, the MFP 300 performs processing for a job notification reception event and transmits a job information request to the management server 400 in Step S1209. In response to the job information request being transmitted, the management server 400 transmits the print job spooled in the hard disk unit 402 to the MFP 300 in Step S1210. The MFP 300 executes, upon reception of job information (print job), the print job in Step S1211. As such, in the case where the power of the MFP 300 is turned on in the state in which the print job is spooled in the management server 400, the job notification is transmitted to the MFP 300 from the management server 400. As a result, the job inquiry to the management server 400 is made from the MFP 300 and the print job is promptly executed.

In making control as described above, a problem that an unexecuted job is still held in the management server 400, in the case where the power of the MFP 300 is turned on in the state in which the management server 400 fails to give job notification to the MFP 300, can be resolved. Further, in the case where the MFP 300 has established the XMPP connection to the management server 400 after the power of the MFP 300 is turned on, job inquiry processing will not be executed if the print job does not exist in the management server 400. Therefore, there is no possibility that job inquiry is unnecessarily executed in the case in which the management server 400 has no job. As a result, the communication traffic between the management server 400 and the MFP 300 and the loads of the management server 400 can be alleviated.

Incidentally, in the explanation of the present embodiment, the case where the management server 400 performs processing to confirm the presence/absence of a print job for the specified MFP 300 and to transmit job notification at the timing of the processing of establishing the XMPP connection has been introduced, but other timings may also be used as a configuration. For example, the processing may be controlled to be performed after the lapse of predetermined time after establishment of the XMPP connection. Alternatively, the processing may be controlled to be performed, after the XMPP connection has been established, at the timing at which message communications or the like for notifying the management server of the state of the apparatus is made from the MFP 300. Further, a condition by combining the above configurations may be used. The management server 400 can specify that, after processing of controlling communications with the MFP 300 has been performed, communications with that MFP 300 are successfully made. Therefore, in the case where the management server 400 holds a job for that MFP 300, the management server 400 transmits, after the processing of controlling the communications with the MFP 300 has been performed, to that MFP 300 a notification message indicating the occurrence of the job. As a result, for example, even if the MFP 300 in a power-off state has been transited to a power-on state, the management server 400 can transmit the job notification to the MFP 300 without increasing unnecessary traffic.

Furthermore, in the explanation of the present embodiment, the case of the print job for printing on a print medium by the print unit 317 of the MFP 300 as a type of a job to be transmitted from the management server 400 and executed by the MFP 300 has been introduced, but other types of jobs may also be used. For example, a scan job in which an image read from a document by the scanner unit 315 is sent to the management server 400 may be considered. Moreover, upon receiving notification on the print job and scan job, the MFP 300 may be controlled to achieve simultaneous parallel activation.

Other Embodiments

In the earlier first embodiment, the example of the multifunction printer (MFP) equipped with the printing apparatus, scanner, and other functions as a processing apparatus has been explained, but there may be a case of using other processing apparatuses having functions other than a printing function and a scanning function. Also, the case where the management server 400 and the MFP 300 are connected via the internet 101 has been mainly explained, but these apparatuses may be in a configuration that is directly connected to each other via a local network.

Further, in the first embodiment, the example of using the XMPP as a protocol to establish a session between the MFP and the management server has been explained, but such a protocol is not limited to this. Other protocols may be used to establish a session and exchange information.

Moreover, in the first embodiment, the example of processing to start establishment of the XMPP connection in the case where the power of the MFP is turned on has been explained, but the processing to be a trigger of starting the establishment of the XMPP connection is not limited to the case where the power is turned on. For example, in the case where the MFP activates while a network function is in a disabled state and then the network function is enabled, processing to start establishing the XMPP connection to the management server is made by the MFP. Alternatively, also in the case where the power of the wireless LAN access point 321 is switched from off to on, the processing to start establishing the XMPP connection to the management server is made by the MFP. Further, in accordance with an instruction given from a user through the operation panel 320, processing to start establishing the XMPP connection to the management server is made by the MFP. Alternatively, to cope with abnormal disconnection of the XMPP connection, the MFP may periodically output requests for establishing the XMPP connection. As such, the processing according to the first embodiment is not limited to processing in the case where the power of the MFP is turned on, but can be replaced with the case of starting the establishment of the XMPP connection by various triggers as described above.

The present invention can be achieved by supplying a program to realize one or more functions according to the above embodiments to a system or an apparatus via a network or a storage medium and by processing to read or execute the program by one or more processors in the computer of the system or the apparatus. Further, the present invention can be achieved by a circuit (e.g., ASIC) to realize one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the processing apparatus is prevented from transmitting a job acquisition request despite the absence of an unprocessed job in the server system side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-015079, filed Jan. 29, 2016, which is hereby incorporated by reference wherein in its entirety.

What is claimed is:

1. A server system which transmits, via a network, a job received via the network to a processing apparatus that executes the job, the server system comprising a transmission unit configured to transmit, in a case where the job for the processing apparatus is held by a holding unit at the time at which a connection of communication with the processing apparatus has been established, a notification message indicating an occurrence of the job to the processing apparatus through the connection-established communication even in a case where no inquiry associated with the job is made from the processing apparatus through the connection-established communication, wherein in a case where the job is not held at the time of establishment of the connection, the transmission unit does not transmit the notification message.

2. The server system according to claim 1, wherein the connection establishment is an establishment of a session of an XMPP.

3. The server system according to claim 1, wherein the transmission unit transmits the notification message in a case where the job is held by the holding unit at the time of establishment of the connection and where processing of notification of an apparatus state is made through the connection-established communication.

4. The server system according to claim 1, further comprising a determination unit configured to determine whether the holding unit holds the job in a case where communication with the processing apparatus is established, wherein the transmission unit transmits the notification message in a case where the determination unit determines that the job is held by the holding unit, and the transmission unit does not transmit the notification message in a case where the determination unit determines that the job is not held by the holding unit.

5. The server system according to claim 4, wherein the determination unit makes the determination after a predetermined time has elapsed from establishment of the connection.

6. The server system according to claim 1, wherein the transmission unit transmits the notification message to the processing apparatus in a case where the job is held by the holding unit at the time of establishment of the connection and even if the notification message indicating the occurrence of the job is already transmitted to the processing apparatus.

7. The server system according to claim 1, wherein the transmission unit transmits, in accordance with a request for the job from the processing apparatus to which the notification message is transmitted, job information associated with the job to the processing apparatus.

8. The server system according to claim 1, further comprising one or more server apparatuses.

9. The server system according to claim 1, wherein the processing apparatus is an apparatus including a printing function, and the job includes a print job for executing printing using the printing function of the processing apparatus.

10. The server system according to claim 1, wherein the processing apparatus is an apparatus including a scanning function, and the job includes a scan job for executing an action of reading a document by using the scanning function of the processing apparatus.

11. An information processing system including a processing apparatus that executes a job and a server system which transmits, via a network, the job received via the network to the processing apparatus, the server system comprising a transmission unit configured to transmit, in a case where the job for the processing apparatus is held by a holding unit at the time at which a connection of communication with the processing apparatus has been established, a notification message indicating an occurrence of the job to the processing apparatus through the connection-established communication even in a case where no inquiry associated with the job is made from the processing apparatus through the connection-established communication, and the processing apparatus comprising an execution unit configured to execute processing in accordance with the job received in response to a job request which has been transmitted to the server system in accordance with the notification message transmitted by the transmission unit, wherein in a case where the job is not held at the time of establishment of the connection, the transmission unit does not transmit the notification message.

12. The information processing system according to claim 11, wherein the connection establishment is an establishment of a session of an XMPP.

13. The information processing system according to claim 11, wherein the transmission unit transmits the notification message in a case where the job is held by the holding unit at the time of establishment of the connection and where processing of notification of an apparatus state is made through the connection-established communication.

14. The information processing system according to claim 11, wherein the server system comprises a determination unit configured to determine whether the holding unit holds the job in a case where communication with the processing apparatus is established, and wherein the transmission unit transmits the notification message in a case where the determination unit determines that the job is held by the holding unit, and the transmission unit does not transmit the notification message in a case where the determination unit determines that the job is not held by the holding unit.

15. The information processing system according to claim 14, wherein the determination unit makes the determination after a predetermined time has elapsed from establishment of the connection.

16. The information processing system according to claim 11, wherein the transmission unit transmits the notification message to the processing apparatus in a case where the job is held by the holding unit at the time of establishment of the connection and even if the notification message indicating the occurrence of the job is already transmitted to the processing apparatus.

17. The information processing system according to claim 11, wherein the transmission unit transmits, in accordance with the job request transmitted from the processing apparatus to which the notification message is transmitted, job information associated with the job to the processing apparatus.

18. The information processing system according to claim 11, wherein the processing apparatus is an apparatus including a printing function, and the job includes a print job for executing printing using the printing function of the processing apparatus.

19. The information processing system according to claim 11, wherein the processing apparatus is an apparatus including a scanning function, and the job includes a scan job for executing an action of reading a document by using the scanning function of the processing apparatus.

20. A control method for a server system which transmits, via a network, a job received via the network to a processing apparatus that executes the job, the control method comprising the step of transmitting, in a case where the job for the processing apparatus is held by a holding unit at the time at which a connection of communication with the processing apparatus has been established, a notification message indicating an occurrence of the job to the processing apparatus through the connection-established communication even in a case where no inquiry associated with the job is made from the processing apparatus through the connection-established communication, wherein in the transmitting step, the notification message is not transmitted in a case where the job is not held at the time of establishment of the connection.

* * * * *